United States Patent [19]

Ty et al.

[11] Patent Number: 4,537,365
[45] Date of Patent: Aug. 27, 1985

[54] SAFETY SEAT BELT SYSTEM AND LATCH RELEASE MECHANISM USED THEREIN

[75] Inventors: Henry Ty, Attleboro, Mass.; Alfred J. White, North Providence, R.I.

[73] Assignee: Texas Instruments Incorporated, Dallas, Tex.

[21] Appl. No.: 395,533

[22] Filed: Jul. 6, 1982

Related U.S. Application Data

[63] Continuation-in-part of Ser. No. 333,234, Dec. 21, 1981, abandoned.

[51] Int. Cl.³ .................... A62B 35/02; B65H 75/48
[52] U.S. Cl. .................... 242/107.6; 280/807; 60/529; 337/70; 337/101; 337/111
[58] Field of Search ............ 242/107.7, 107.6, 107.12, 242/107.4 R; 280/803, 806–808; 180/268–270; 337/99, 101, 111, 70, 76, 378, 379; 60/529, 528

[56] References Cited

U.S. PATENT DOCUMENTS

| | | | |
|---|---|---|---|
| 2,171,895 | 9/1939 | Sardeson | 337/99 |
| 2,267,463 | 12/1941 | Hood et al. | 337/111 X |
| 2,743,574 | 5/1956 | McCorkle | 60/529 |
| 2,821,836 | 2/1958 | McCorkle | 60/529 |
| 3,560,171 | 2/1971 | Ornstein et al. | 337/379 X |
| 3,711,018 | 1/1973 | Scott | 337/99 X |
| 3,712,799 | 1/1973 | Ornstein | 337/379 |
| 4,002,311 | 1/1977 | Fisher et al. | 242/107.7 |

*Primary Examiner*—John M. Jillions
*Attorney, Agent, or Firm*—James P. McAndrews; John A. Haug; Melvin Sharp

[57] ABSTRACT

An over-the-shoulder automotive safety seat belt system having a latch providing a tensionless comfort setting for the belt during use and having remotely operable thermostat metal means to release the latch and permit automatic belt retraction after use is shown to have an improved electrically operable latch release mechanism providing reliable latching and providing fast and reliable latch release operation at low power levels.

24 Claims, 16 Drawing Figures

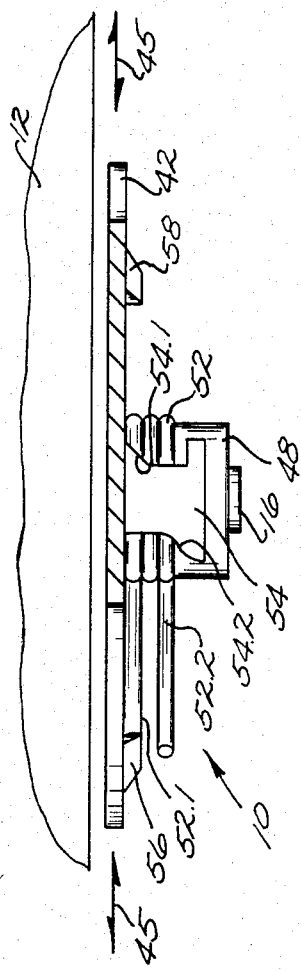
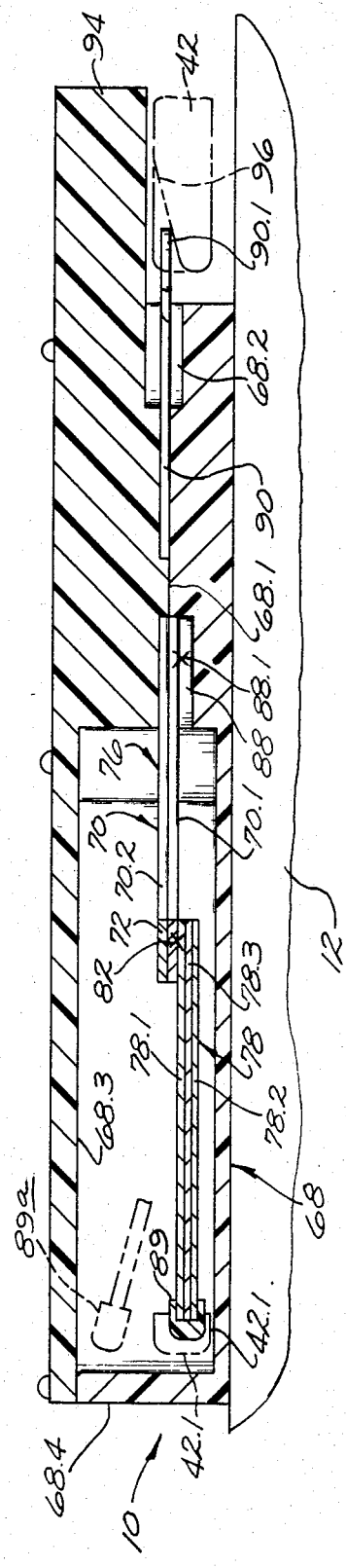

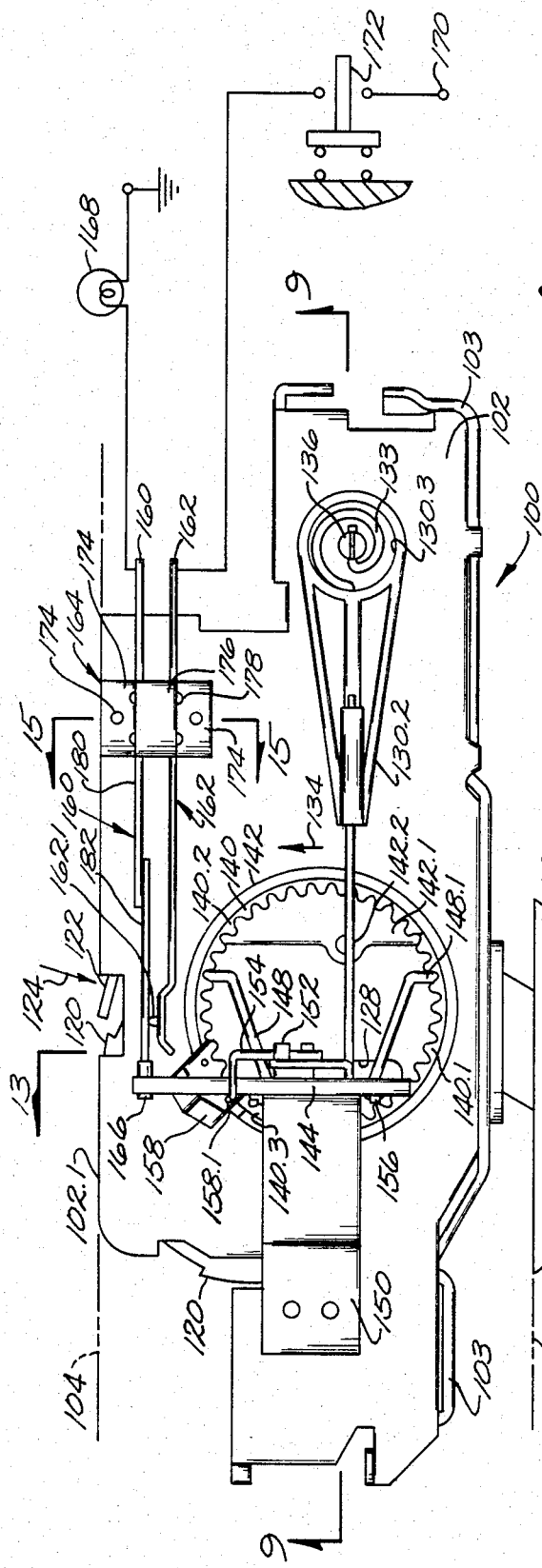
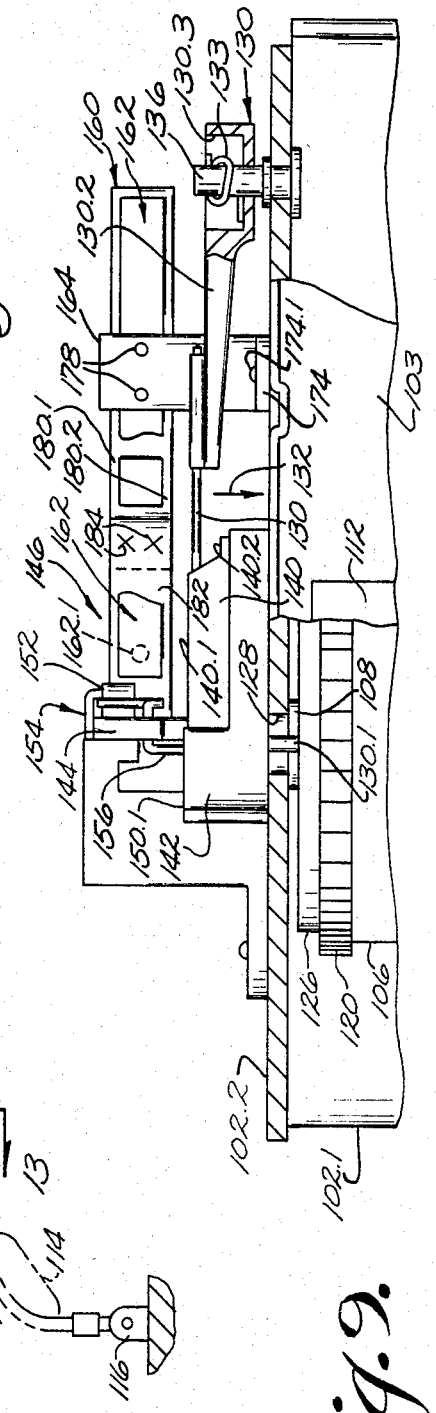
Fig. 8.
Fig. 9.

SAFETY SEAT BELT SYSTEM AND LATCH RELEASE MECHANISM USED THEREIN

CROSS REFERENCE

This application is a continuation-in-part of the commonly assigned, copending application of the present inventors, Ser. No. 333,234, filed Dec. 21, 1981, for Safety Seat Belt System and Latch Release Mechanism Used Therein, now abandoned.

BACKGROUND OF THE INVENTION

The field of this invention is that of safety seat belt systems and the like and the invention relates more particularly to over-the-shoulder automotive safety belts having latch means providing tensionless comfort settings for the belts during use and having remotely operable thermostat metal means to release the latch means and permit automatic belt retraction after use.

Conventional automotive safety belt systems permit a length of belt to be withdrawn from a supply reel and passed over the shoulder of a vehicle operator or passenger to be buckled to a support connected to the vehicle floor. In early systems, springs automatically retracted the belt after use and, by applying a retracting spring force to a buckled belt, also serve to draw the belt snugly against the operator's shoulder to assure that only a safe length of the belt was left in the withdrawn position. The length of belt would then be locked in its withdrawn position by an inertially operated lock during any abrupt stopping of the vehicle to provide restraint to protect the operator from injury.

More recently, such over-the-shoulder systems have included comfort means which permit the operator to pull out a small additional length of belt and to latch that additional belt in withdrawn position to release the tension on the belt so that, while the length of belt still provides safe restraint to protect the operator, it rests more comfortably on the operator's shoulder during normal vehicle operation. However, such tensionless systems have typically required the user to reset the system after use. In one known system, for example, where a stylus pawl is adapted to engage a ratchet for providing the tensionless belt setting, the seat belt user is required to pull on the belt in a particular manner to release the pawl engagement with the ratchet after unfastening the belt and before leaving the vehicle so that the withdrawn length of the belt will be retracted onto the belt supply reel. If that user action is omitted, the length of belt remains withdrawn and clutters the passenger space during reentry of the vehicle until the user resets the retraction system.

Other tensionless systems have provided latch release means to permit the belt to be automatically retracted after use but such automatic release systems have been expensive and cumbersome. In one widely used system for example, a ratchet and pawl latch is arranged to be actuated by a plunger which is set or released by closing or opening of the vehicle door. In that arrangement, closing of the door positions the plunger so that, when the vehicle operator buckles his belt and then pulls out a small additional length of belt to provide a desired tensionless or comfort setting, the ratchet and pawl latch holds the additional length of belt in its withdrawn position. When the operator subsequently unbuckles the belt and opens the vehicle door, the plunger moves and releases the latch and permits the belt to be automatically retracted. In that system, it has been difficult and expensive to mount the plunger to achieve reliable system operation. Usually the mounting location for the system has been limited by the need for mechanical linkage between the system and the door-mounted plunger. More importantly, the spring requirements of the plunger have been such that they have added very undesirably to the forces required for closing the vehicle door.

A seat belt system having a new clutch type of comfort latch has now been proposed and it has been suggested that a strip of thermostat metal be arranged to serve as a latch release in that system. As proposed, the thermostat metal strip would be electrically heated by the same electrical circuit which energizes the interior dome light of the vehicle to release the latch when the vehicle door is opened. In that way, the latch release could be operated at a location remote from the door and no excessive door closing forces would be imposed. In the proposed new system however, the comfort latch extended radially from one end of a belt reel shaft and the proposed thermostat metal strip was mounted at one end to extend tangentially relative to the shaft axis to intercept the rotating latch on the distal end of the strip, the strip being adapted to flex when heated to move its distal end in a radial direction relative to the shaft to release the latch. As thus proposed, the latch release system would be expensive and unreliable. That is, the thermostat metal strip would tend to bow when heated rather than to release the latch. A comfort latched seat belt system having such a release arrangement would also tend to require excessive operating and resetting times, would be subject to inadvertent triping due to changes in ambient temperature, would be unreliable in latch release operation, and would tend to be subject to overheating if vehicle doors were left opened for an extended period of time.

BRIEF SUMMARY OF THE INVENTION

It is an object of this invention to provide a novel and improved electrically operable thermostat metal control; to provide such a control which is of rugged and inexpensive construction; to provide such a control which is particularly adapted for use as a latch release mechanism in an automotive seat belt retraction system or the like; to provide such a latch release which is particularly adapted for use with tensionless seat belt retraction systems; to provide such a latch release which is useful with tensionless seat belt retraction systems utilizing stylus pawl and ratchet latching means; to provide such a latch release which is particularly adapted for use with the new type of comfort latch noted above; to provide such a latch release mechanism which is fast and reliable in use, which is free from inadvertent tripping during ambient temperature changes, and which is not subject to overheating; and to provide novel and improved safety belt systems incorporating such latch release mechanisms.

Briefly described, the novel and improved thermostat metal latch release mechanism of this invention comprises first and second thermally responsive bimetal strips which are welded together end to end to form a reverse bimetal. One end of the reverse bimetal is secured to an insulating support so that a control portion at the opposite end of the reverse bimetal is free to move relative to the support. Terminals are provided for directing electrical current through the reverse bimetal for self-heating it. Preferably the first bimetal strip has a cut-out or the like providing a portion of the strip with a reduced cross-section. Preferably, for example, the first strip has a U-shape and the bottom of the U is welded to the second strip, the ends of the two legs of the U-shape then being connected to the terminals and secured to the support so that electrical current is directed through the reduced cross-section of the two legs of the first strip and part of the second strip in series for self-heating the bimetal. The first and second bimetals have corresponding thermal response characteristics to counteract each other during ambient temperature changes so that the control portion of the reverse bimetal does not move in response to changes in ambient temperature. However, the first cut-out or U-shaped bimetal has relatively greater electrical resistivity than the second strip and therefore self-heats more rapidly when electrical current is directed through the reverse bimetal, thereby to selectively move the control portion of the reverse bimetal to perform a latch releasing control function or the like as desired.

In a preferred embodiment, the release mechanism is used in an over-the-shoulder safety belt retraction system or the like having a belt supply reel from which a belt can be withdrawn, having springs for normally retracting the withdrawn belt, and having a member which is part of comfort control latch means or the like which is biased to move in a selected direction in a plane from a first control position where the latch means limits belt retraction to provide a tensionless setting of the belt to a second control position where the latch means permits full retraction of the belt after use. When used in that system, each of the first and second bimetal strips has layers of metal of relatively high and low coefficients of thermal expansion bonded together in layer relation to each other and the strips have selected lengths, widths and thicknesses such that the reverse bimetal has a preferred direction of flexing perpendicular to the metal layers in response to temperature change and has a maximum resistance to bending in response to applied force in a direction transverse to the widths of the first and second strips. The reverse bimetal is arranged in one preferred embodiment of the safety belt system with the metal layers extending generally parallel to the plane of movement of the latch member and with the widths of the two bimetal strips extending parallel to the direction of latch member movement. In that way, the control portion of the reverse bimetal is normally adapted to engage the latch member and reliably oppose movement of the latch member from its first control position even though the bimetal is small and adapted to be rapidly heated with a low power input. The control portion of the reverse bimetal is also easily and reliably moved to release the latch means to move to its second control position in response to selective electrical heating of the reverse bimetal. In that way, the orientation of the reverse bimetal relative to the plane and direction of movement of the latch member assures fast and reliable latch member releasing operation. Preferably, contact means are provided in series with the reverse bimetal in the latch release mechanism and cam means are provided on the latch member for separating the contacts to open the reverse bimetal heating circuit whenever the latch is out of its first control position, thereby to protect the bimetal against overheating after it has performed its latch release function. In that arrangement, the safety belt retraction system is of rugged and low cost construction, is electrically operable from a remote location by the use of a door-mounted dome light switch or the like without imposing extra door closing requirements, avoids inadvertent tripping due to ambient temperature changes, operates very rapidly and at low power levels, is adapted to rapidly reset after use, and is not subject to overheating.

DESCRIPTION OF THE DRAWINGS

Other objects, advantages and details of the novel and improved electrically operable latch release mechanism and seat belt retraction system of this invention appear in the following detailed description of preferred embodiments of the invention, the detailed description referring to the drawings in which:

FIG. 2 is a partial section view along line 2—2 of FIG. 1;

FIG. 3 is a partial section view to enlarged scale along line 3—3 of FIG. 1;

FIG. 8 is a side elevation view similar to FIG. 1 illustrating another preferred embodiment of the safety belt retraction system of this invention incorporating another preferred embodiment of the novel and improved latch release mechanism of this invention and diagrammatically illustrating use and electrical operation of the system;

FIG. 9 is a section view along line 9—9 of FIG. 8;

DESCRIPTION OF THE PREFERRED EMBODIMENTS

Figure 4:
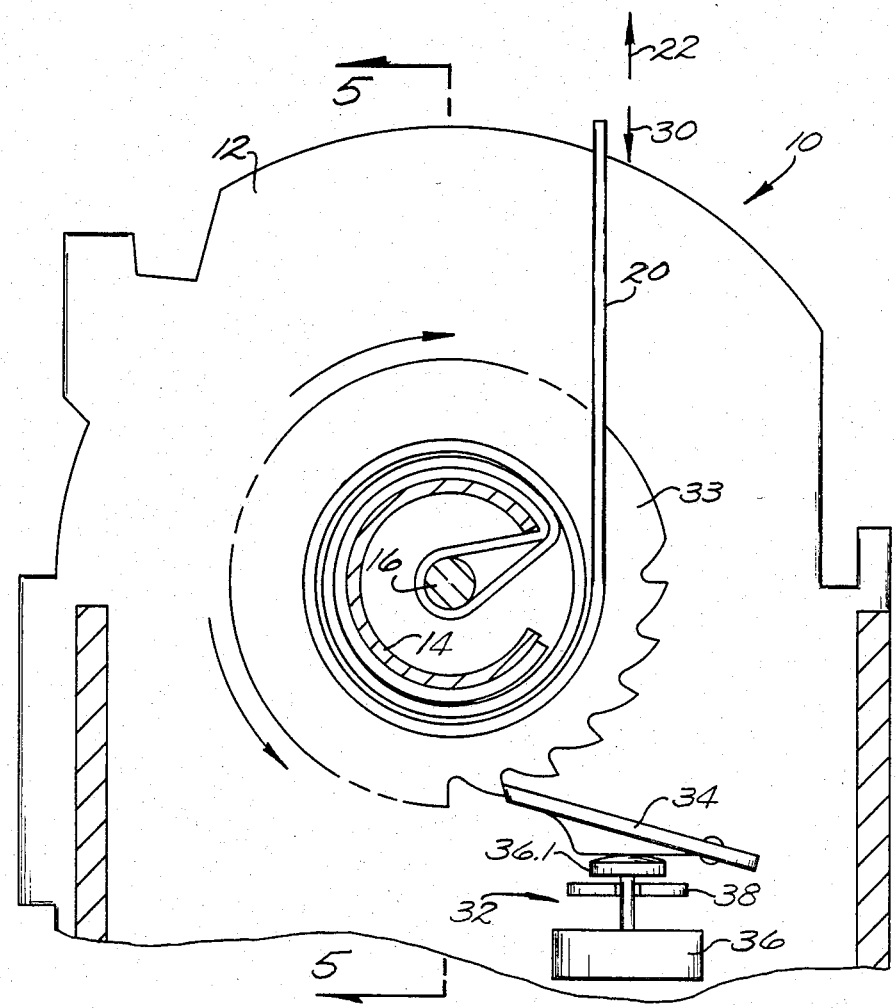
FIG. 4 is a partial section view along the central axis of the safety belt system of FIG. 1.
Figure 5:
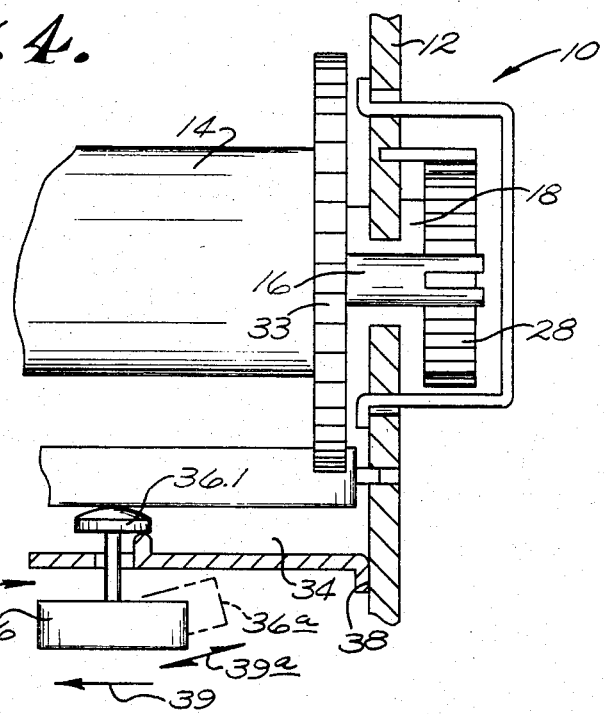
FIG. 5 is a partial section view along line 5—5 of FIG. 4.
Figure 6:
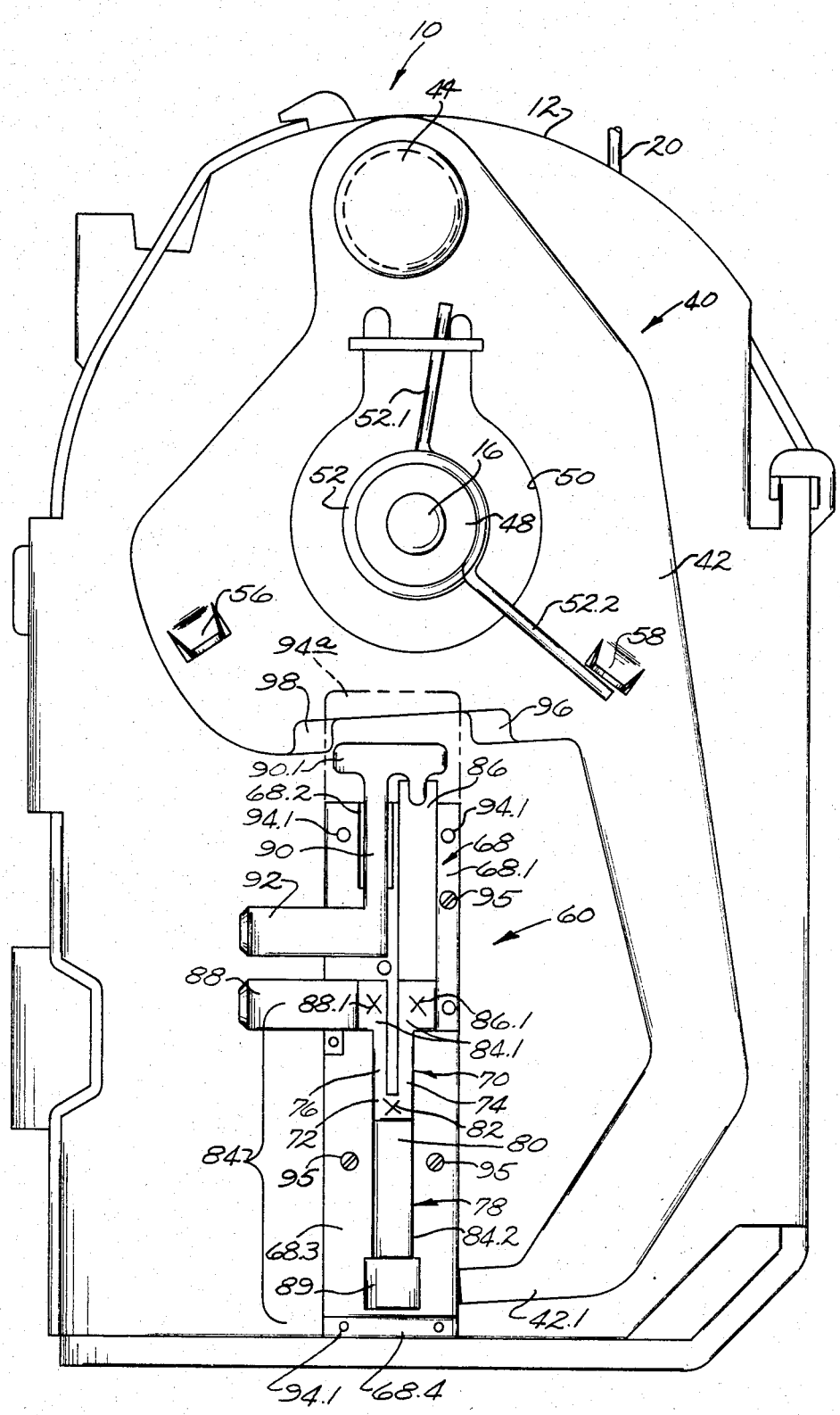
FIG. 6 is a side elevation view similar to FIG. 1 illustrating the latch release mechanism in another operational position.

Referring to the drawings, 10 in FIGS. 1-7 indicates the novel and improved safety belt retraction system of this invention which is shown to include a strong and rigid metal frame or housing 12 having a generally box-like configuration and having a safety belt supply cylinder or reel 14 mounted within the housing for rotation on a shaft 16 journaled as at 18 in the walls of the housing. The frame is secured to an automobile 19 in any conventional manner. A web safety belt 20 is coiled on the reel so that a length of the belt is adapted to be withdrawn as indicated by arrows 22 (FIGS. 1 and 4) and passed over the shoulder of a vehicle operator or passenger 24 and buckled as at 26 to a support attached to the vehicle floor. See FIG. 1. Coil spring means 28 are connected to the shaft and to the frame to be tensioned as the belt is withdrawn for normally biasing the reel to rotate in the opposite direction to retract the belt as indicated by the arrows 30, whereby the belt tends to fit snugly against the operator's chest. In that way, the spring 28 tends to permit a safe length of the buckled belt to be retained in the withdrawn position. The retraction system preferably includes inertial lock means 32 as indicated in FIGS. 4 and 5 which serve to lock that safe length of belt in its withdrawn position during abrupt stopping of the vehicle 19 to provide restraint and protect the operator 24. Typically for example, a ratchet 33 is mounted to rotate with the reel 14 and a pawl 34 is rotatably mounted on the frame 12. A pendulum weight 36 is hung on a bracket 38 attached to the frame so that it normally occupies the position indicated by dotted lines 36a in FIG. 5 when the vehicle 19 is moving in the direction indicated by the arrow 39 but is adapted to swing to the position shown in solid lines in FIG. 5 as indicated by the arrow 39a if vehicle movement is abruptly stopped. In that way, a cam 36.1 movable with the weight lifts the pawl 34 into engagement with the ratchet 33 attached to the belt supply reel 14. The pawl 34 locks the withdrawn belt 20 at its safe length during the abrupt stopping to restrain operator movement. (For ease of illustration, the position of the vehicle operator 24 has been shown 90° out of true orientation of vehicle direction as indicated by the arrow 39).

In the seat belt retraction system of this invention latch means 40 are provided to permit the vehicle operator to withdraw a small additional length of belt from the reel and to latch that additional length of belt in its withdrawn position so that the belt is no longer pulled snugly against the operator's chest but rests more comfortably on his shoulder during normal vehicle operation. The system provides a comfort setting which assures that the additional latched out length of belt is not too great so that the belt length is correct for providing safe restraint to protect the operator during abrupt vehicle stopping. The system also provides for automatic release of the latch means 40 so that the withdrawn length of belt 20 is automatically retracted by the spring 28 after use.

Figure 1:
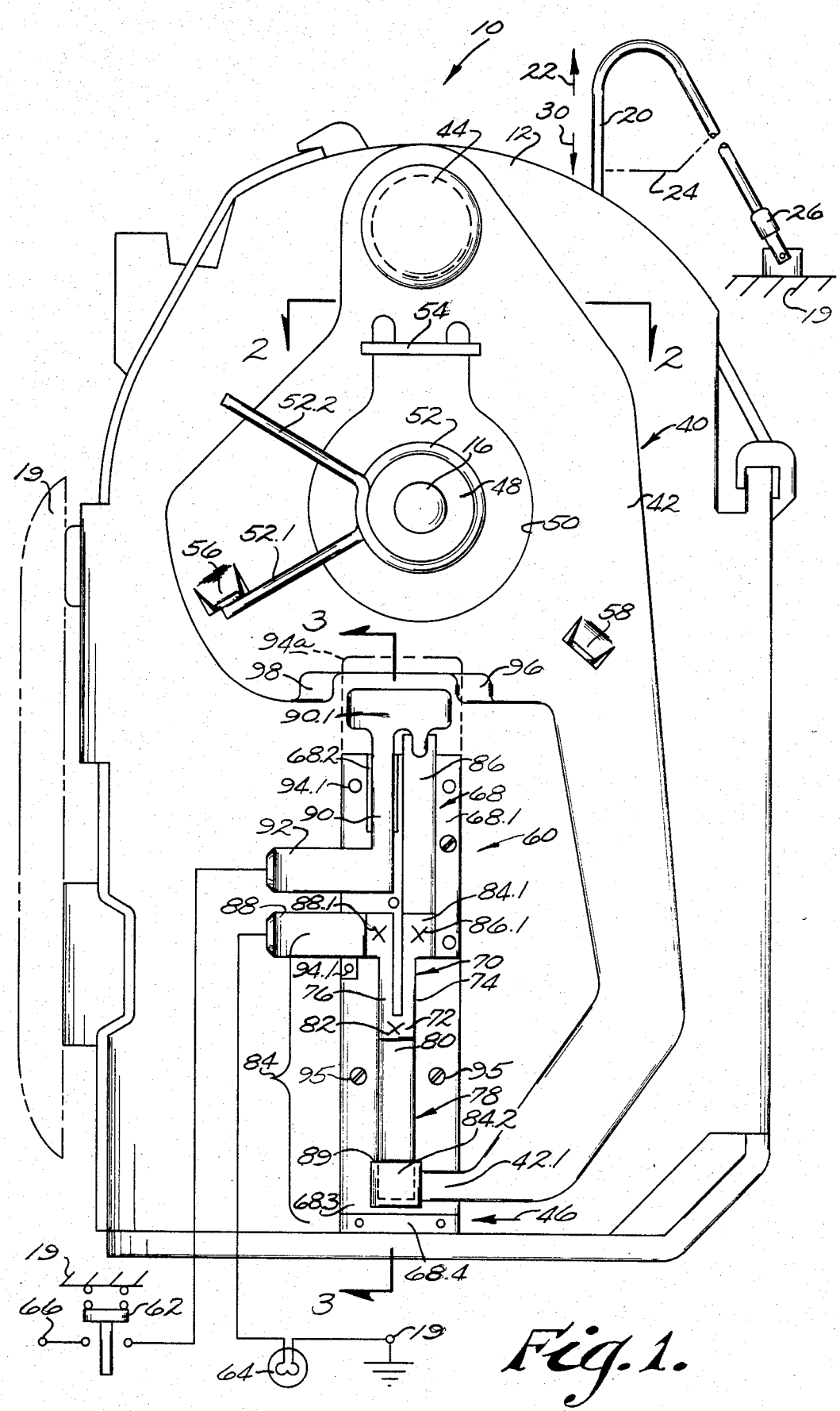
FIG. 1 is a side elavation view of a preferred embodiment of the safety belt retraction system of this invention illustrating a preferred embodiment of the novel and improved latch release mechanism of the invention in one operational position, the view also diagrammatically illustrating electrical operation of the system.
Figure 7:
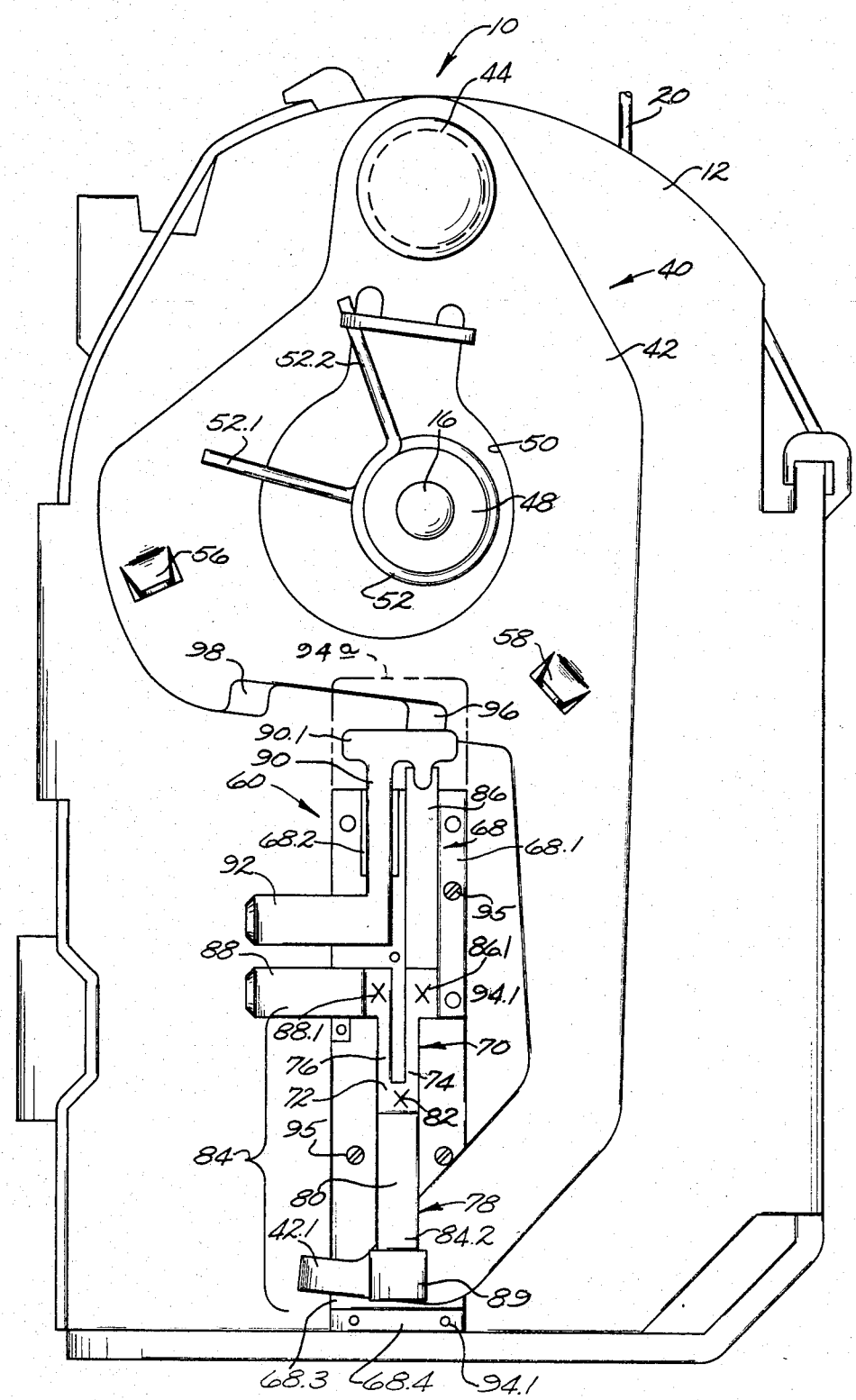
FIG. 7 is a side elevation view similar to FIG. 1 illustrating the latch mechanism in an additional operational position.
Figure 10:
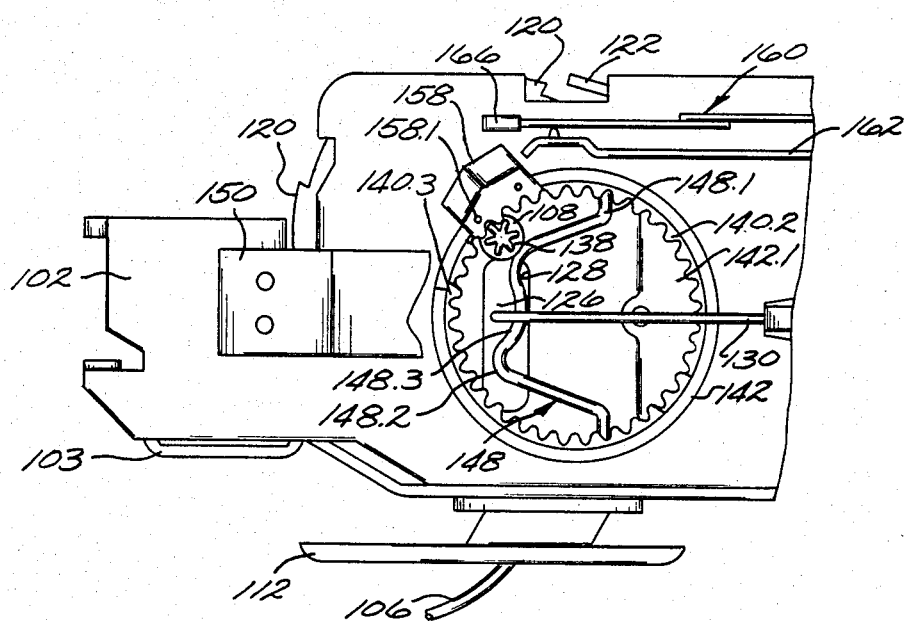
FIG. 10 is a partial side elevation view similar to FIG. 8 partially cut away to further illustrate the system of FIG. 8.

In a preferred embodiment of the invention for example, a latch arm 42 is pivoted on the frame 12 at 44 so that the arm is free to move in a plane (indicated by arrows 45 in FIG. 2) in a direction as indicated by arrows 46 in FIG. 1. A clutch bearing 48 of a nylon material or the like is fixed on an end of the shaft 16 and the latch arm 42 has a central opening 50 which is fitted over the shaft end and over the clutch bearing so that the arm is free to pivot without interference with the shaft or bearing. A clutch coil spring 52 having an inner tang 52.1 and a outer tang 52.2 extending radially out from the coil spring is fitted over the clutch bearing as shown in FIG. 1. The latch arm has a top cam 54 having a first cam surface 54.1 at one side of the cam (see FIG. 2) which tapers outwardly from the latch arm 42. The top cam also has a second cam surface 54.2 at the opposite side of the cam tapering inwardly toward the latch arm. Preferably, a catch is raised from the cam arm and has a selected orientation relative to the pivot 44 and to the lengths of the tangs 52.1 as described below. In that arrangement, the latch arm 42 is adapted to be pivoted (clockwise as viewed in FIG. 1) from a first control or latch position shown in FIG. 1 to a second control or latch position as illustrated in FIG. 7.

In the system of this invention, an electrically operable thermostat metal latch release mechanism 60 is arranged at the same end of the housing frame 12 for normally holding the latch arm in its first latch position, the mechanism being selectively operable from a remote location for operating the mechanism to selectively release the latch. Preferably for example, the latch release mechanism is arranged in series with a spring mounted switch 62 which is located in a door post or support of the vehicle 19 to be opened (as is diagrammatically shown in FIG. 1) when the vehicle door is closed and to be automatically closed to electrically energize the mechanism 60 along with an interior or dome light 64 or the like from the vehicle power supply indicated at 66 each time that the vehicle door (not shown) is opened. As thus far set out, the seat belt retraction system 10 has been known and does not constitute part of the present invention.

In accordance with this invention, the release mechanism 60 includes an electrically insulated base or support 68 of a polycarbonate material or the like having a platform part 68.1, having a groove 68.2, having a window opening 68.3, and having a spacer part 68.4. A first strip 70 of a thermally responsive bimetal is preferably provided with U-shape having a bottom 72 at one end of the strip and having two legs 74, 76 which terminate at the opposite end of the strip. A second strip 78 of another thermally responsive bimetal material has one end 80 welded to the bottom 74 of a U of the first strip as indicated at 82 to form a reverse bimetal as indicated at 84. That is, the first strip 70 comprises layers of metal 70.1 and 70.2 of relatively high and relatively low coefficients of thermal expansion respectively which are metallurgically bonded together in layer relation to each other in conventional manner to form a conventional thermostat bimetal. The second strip 78 also comprises layers of metal 78.1 and 78.2 of relatively high and low coefficient of thermal expansion respectively which are bonded together in layer relation. The two high expansion sides 70.1 and 78.1 of the two strips are then abutted in slightly overlapped relation in the area of the weld 82 so that the low expansion sides 70.2 and 78.2 of the strips face outwardly from opposite sides of the reverse bimetal 84. Of course, the bimetal strips may also have three or more metal layers in conventional manner within the scope of this invention.

In the preferred embodiment, a fixed contact arm 86 is welded to one leg 74 of the first bimetal strip as indicated at 86.1 and a terminal 88 is welded to the other leg 76 as indicated at 88.1. The resulting welded assembly is then mounted on the platform part 68.1 of the insulating support so that the first end 84.1 of the reversed bimetal formed by the two ends of the legs 74, 76 are secured in fixed position on the support and so that a control portion 84.2 at the opposite end of the reverse bimetal extends into the window opening 68.3 of the support and is free to move up and down in that window. A tip 89 of a mineral filled nylon having relatively low friction characteristics is preferably fitted over the control portion of the reverse bimetal. A resilient movable contact arm 90 is also mounted on the platform part 68.1 of the support so that a movable contact portion 90.1 of the arm extends over the groove 68.2 to be movable into and out of engagement with the fixed contact arm 86. A terminal 92 is preferably connected to or formed as part of the resilient arm as shown in FIG. 1.

Preferably for example, the platform part 68.1 of the support is recessed to accommodate the contact arms, terminals and fixed end 84.1 of the reversed bimetal. An insulating cover 94 also preferably formed of polycarbonate or the like is secured over the base support 68 by means of rivets 94.1 and by means of cement (not shown) or the like for clamping the contact arms, terminals and bimetal end to the support. In that arrangement, electrical current is adapted to be directed through the reverse bimetal 84 from the terminals 88 and 92 whenever the contacts 86 and 90 are engaged if the switch 62 is closed, thereby to electrically self-heat the reverse bimetal 84. Preferably, screws 95 or the like serve to mount the mechanism 60 on the system frame 12. Preferably, the cover 94 is proportioned so that it extends over the latch arm 42, the cover being indicated in FIG. 1 by broken lines 94a. The window opening 68.3 of the support is also proportioned so that the tip 42.1 of the latch arm is free to move through that window opening during pivoting of the arm. However, the tip 89 on the control portion of the reversed bimetal is normally located in the window opening as shown in solid lines in FIG. 3 for intercepting and opposing movement of the latch arm tip 42.1 through the window opening. When the reverse bimetal is flexed to the position shown in broken lines 89a in FIG. 3, the latch arm tip 42.1 is free to pass through under the tip as will be understood. Cam surfaces 96 and 98 are preferably provided on the latch arm 42 to be disposed at either side of the end 90.1 of the movable contact arm when the latch arm 42 is in its first latch position as shown in FIG. 1. The cam means are each tapered to lift the movable contact arm 90.1 out of engagement with the fixed contact 86 if either of the cam surfaces is moved under the end 90.1 of the movable arm.

In accordance with this invention, the first and second bimetal strips 70 and 78 have corresponding thermal response characteristics so that the control portion 84.2 (tipped at 89) of the reversed bimetal does not move during changes in ambient temperature. That is, the lengths of the strip are proportioned relative to their respective flexivities in response to change in temperature likely to be encountered in automotive environments so that any tendency of the strip 70 to flex upwardly (as viewed in FIG. 3) in response to increase in ambient temperature is counteracted by the tendency of the strip 78 to flex downwardly in response to the same temperature increase. However, the strip materials are selected so that the first strip 70 has relatively much greater electrical resistivity than the second strip. In that arrangement, particularly when electrical current is directed through the two legs 74 and 76 of the first strip, the strip 70 is heated much more rapidly than the second strip 78 so that the reverse bimetal 84 flexes and moves the control portion tip 89 to the latch release position shown in broken lines 89a in FIG. 3.

In a preferred embodiment for example, the first strip comprises a layer 70.1 of a metal alloy having a nominal composition by weight of 72% manganese, 18% copper and 10% nickel and a layer 70.2 of a metal alloy having a nominal composition by weight of 36% nickel and the balance iron, the layer 70.1 preferably comprising about 55% of the total thickness of the stop so that the stop has a resistivity of about 675 ohms per circular mil foot.

The strip 70 is preferably about 0.010 inches thick and each leg 74, 76 is about 0.050 inches wide. The second strip 78 has a metal layer 78.1 having the same composition as layer 70.1, has a metal layer 78.2 having the same composition as layer 70.2, and has an intermediate layer 78.3 of a high conductivity copper alloy such as CDA Alloy 107, the relative thicknesses of the layers being selected so that the strip has a resistivity of about 60 ohms per circular mil foot. In that arrangement, when the strip 70 and 78 are proportioned relative to each other to conteract each other during changes in ambient temperature, the reverse bimetal is adapted to be moved to latch release position in 1 to 3 seconds, typically about 1.5 seconds, when energized at about 5 to 6 amps at 12 volts.

In operation of the system 10, the operator opens the car door and enters the car. At that door movement, the door switch 62 closes and energizes dome light 64. The switch closing also enables the release mechanism 60. However, at that point, the latch arm 42 is in the position shown in FIG. 7 so that the cam 96 holds movable contact 90.1 separated from the fixed contact 86 so that the release mechanism 60 is not energized. Even if the door is held open for an extended period, no heating of the mechanism 60 occurs.

The operator then closes the vehicle door which turns off the dome light and deenergizes the release mechanism 60 by opening of the switch 62.

The operator then draws out and buckle his seat belt. As that occurs, the clutch spring 52 grips the bearing 48 and rotates with the belt reel shaft 16. The inner spring tang 52.1 strikes the catch 58 on the latch arm 42 and pivots the arm to the position shown in FIG. 7. The inner tang 52.1 of the spring then moves past that catch 58 as the latch arm pivots to the right and moves counter clockwise to the position shown in FIG. 7 where it engages the cam surface 54.1 of the top cam. That cam engagement stops rotation of the spring 52, loosens the spring on the bearing 48, and cams the loosened spring axially out on the bearing 48 to be spaced further from the arm 42. In that way, the shaft 16 is permitted to continue to rotate to permit the operator to withdraw the desired length of belt. When the operator then releases his pulling force on the belt, engagement of the spring tang 52.1 with the cam surface 54.1 is released, the clutch spring 52 again grips the clutch bearing 48, and rotates clockwise with the bearing and shaft as any extra length of the withdrawn and buckled belt is retracted and recoiled by the spring 28. As that occurs, the inner tang 52.1 of the clutch spring passes over the catches 56 and 58 and the outer tang 52.2 of the clutch spring engages the opposite cam surface 54.2 of the top cam. (See FIG. 7 for an alternate illustration of such engagement). When that occurs, rotation of the clutch spring 52 with the clutch bearing is halted, the spring is loosened on the clutch bearing, and the spring is cammed axially inward on the shaft 16 and on the bearing 48 to again rest close to the latch arm 42. In that way, the shaft 16 is permitted to continue to rotate to retract all extra length of withdrawn belt and to draw the belt snugly against the shoulder of the vehicle operator.

The operator then pulls out a small additional length of belt and immediately releases it to provide a tensionless comfort setting for the belt. As he pulls out the belt, the inner spring tang 52.1 passes over the latch arm catch 56 when about 2 inches of the belt is withdrawn or engages the cam surface 54.1 when about 6 inches of belt is withdrawn. If he releases the belt before 2 inches is withdrawn, the spring 28 returns the belt to its snug position against the operator's shoulder or if he pulls out more than 6 inches, the clutch spring 52 is loosened from the clutch bearing by the cam 54.1 as above described and no comfort setting is made. However, if between 2 and 6 inches are withdrawn before the belt is released, the inner spring tang 52.1 lodges behind latch arm catch 56 as shown in FIG. 1 as the belt recoiling spring 28 tries to recoil the additional length of belt which the operator has withdrawn. The force of that spring tang 52.1 against the catch 56 tends to pivot the arm 42 to the left as viewed in FIG. 1 so that the spring tang tends to slip by the catch. However, the tip 42.1 of the latch arm is caught behind the control portion tip 89 of the latch release mechanism 60 as is shown in FIG. 1. The engagement of the release mechanism with the latch arm tip 42.1 prevents full pivoting of the arm so the spring tang 52.1 remains engaged with the catch 56. As a result, the spring 52 tightens on the clutch bearing 48 and retains the additional 2 inches of withdrawn belt in its withdrawn position so that the belt rests comfortably over the operator's shoulder during normal vehicle operation. At that point, the latch arm cams 96 and 98 are both spaced out from beneath the movable contact arm so that the contact portion 90.1 is engaged with the fixed contact 86 in the release mechanism. The system 10 therefore provides a comfortable belt setting while also providing a safe length of belt to protect the vehicle operator during abrupt vehicle stopping.

When the operator subsequently stops the vehicle, unbuckles the belt, and opens the vehicle door to leave the vehicle, the switch 62 closes as described above to again enable the release mechanism 60. In this instance however, the contacts 90 and 86 are engaged so that electrical current is directed through both legs 74, 76 of the high resistance bimetal strip 70 and through a small part of the low resistance strip 78. In that way, the strip 70 is rapidly self-heated and the reverse bimetal is flexed so that the tip 89 moves to the position shown in dotted lines in FIG. 3. Accordingly, the latch 40 is released and the belt is permitted to be automatically and fully retracted by the spring 28. As noted above, that latch release operation typically requires only about 1–3 seconds so that fast and reliable retraction of the unbuckled belt occurs. Then, as soon as the latch arm 42 moves in completing its latch release function, the cam 96 on the latch arm moves under the contact 90.1 and separates the contacts 90 and 86. Accordingly, if the car door should remain open for an extended period of time, no overheating of the release mechanism 60 can occur. Similarly, if any bounce back or other dislodgement of the latch arm 42 should occur so that the arm is out of its first latched position (in a position such as that shown in FIG. 6 for example), the cam means 98 alternately move under the arm 90 to open the release mechanism circuit.

It can be seen that, in the release mechanism 60 as above described, the reverse bimetal 84 is arranged so that the metal layers embodied in the first and second bimetal strips 70 and 78 extend in generally parallel relation to the plane 45 of movement of the latch arm 42 and so that the widths of the strips 70 and 78 extend generally parallel to the direction 46 of unlatching movement of the latch arm. In that regard, the lengths, widths and thicknesses of the strips 70 and 78 are selected so that the reverse bimetal 84 has a preferred flexing direction perpendicular to the plane 45 in response to temperature changes and also so that the reverse bimetal has a maximum resistance to bending in response to applied force in a direction transverse to the widths of the strips 70 and 78. In that way, a small reverse bimetal strip 84 is adapted to provide secure and reliable holding of the latch arm 42 in its first control position as shown in FIG. 1. However, the reverse bimetal is also adapted to provide sure reliable release of the latch arm when the mechanism is electrically operated for selectively heating the reverse bimetal. That is, the orientation of the reverse bimetal strip relative to the plane and direction of movement of the latch arm 42 permits a small reverse bimetal to provide reliable latching and latch releasing so that the reverse bimetal is adapted to be heated within a short period of time and is adapted to cool for resetting within a short period of time.

Another alternate embodiment 100 of the belt retraction system of this invention is shown in FIGS. 8–16. In that alternate system, a U-shaped frame 102 having a cover 103 has the bottom 102.1 of the U-shape secured to the roof of an automobile 104. The frame encloses a reel of safety belt 106 rotatable on shaft 108 (see FIGS. 9 and 10) extending between the legs 102.2 of the U-shaped frame so that a length of the belt is adapted to be withdrawn as indicated by arrow 110 in FIG. 8. The belt is preferably passed through a grommet 112 positioned in a vehicle roof panel diagrammatically illustrated at 104a and is passed over the shoulder of the vehicle operator or passenger 114 and buckled to a support 116 on the vehicle floor. Coil spring means (not shown) bias the reel of safety belt 106 to normally rewind and retract the belt as indicated by the arrow 118 in FIG. 8 to draw the belt snugly against the operator's chest 114 in conventional manner as will be understood. As thus described, the reel of safety belt 106 rotates clockwise around the axis 108 (as viewed in FIGS. 8, 10 and 11) during withdrawal of the belt from the reel and rotates counterclockwise during belt retraction.

A saw tooth ratchet 120 is mounted to rotate with the reel of safety belt 106 and an inertially operated pawl 122 is movable as indicated by arrow 124 in FIG. 8 to engage the ratchet 120 and lock the withdrawn length of belt 106 in its withdrawn position during abrupt stopping of the vehicle 104 to provide safe restraint for the operator 114 as has been previously described with reference to system 10.

The system 100 also includes means for providing a safe, tensionless comfort setting for the belt 106. For that purpose, an additional ratchet 126 having cam means and ratchet teeth located on an outer side thereof is mounted to rotate on the axis 108 with the reel of safety belt 106 (See FIG. 9); an opening 128 is provided in a leg 102.2 of the U-shaped frame to permit access to the outer side of the ratchet 126 (See FIGS. 8–10); and a stylus pawl 130 is mounted on the exterior of the frame 102 to pivot on an axis parallel to the axis 108. The stylus 130 extends over part of the ratchet 126 and the distal end 130.1 of the stylus is bent down to fit through the frame opening 128 to engage the ratchet 126. The stylus is spring biased to move with a selected force toward the ratchet 126 as is indicated in FIG. 9 by arrow 132 and is also biased to pivot toward the axis 108 of the belt reel as is indicated by arrow 134 in FIG. 8. Preferably for example, the stylus has a body 130.2 which mounts the stylus end 130.1 and which has a recess 130.3 fitted over an axis pin 136 mounted on the frame 102. A coil spring 133 or the like has one end secured to the body 130.2 inside the recess 130.3 and has its opposite end secured to the axis pin 136 for providing the stylus with the described biases as will be understood.

A gear 138 is mounted on the shaft 108 to rotate as the safety belt 106 is withdrawn or retracted and an inner ring gear 140 is preferably mounted on the frame 102 to mesh with the sprocket or pinion gear 138 and be rotated beneath a portion of the stylus 130. The ring gear has cam dwell and riser portions formed on an edge of the gear for selectively raising and lowering the stylus 130 against its spring bias as the ring gear is rotated beneath the stylus. Preferably for example, a sleeve support 142 has an integral bracket 142.1 across one end of the sleeve and the support is mounted on the frame 102 by a rivet 142.2 or the like passing through the bracket. The ring gear 140 is fitted into the sleeve 142 to be freely rotated inside the sleeve by its meshing engagement with the gear 138. The upper edge of the ring gear has a first cam riser portion 140.1 which normally lifts the stylus pawl 130 out of engagement with the ratchet 126 when the belt 106 is in fully retracted position. When a length of the belt 106 is then first withdrawn so that the gear 138 is rotated, the ring gear 140 moves so that a dwell portion 140.2 of the ring gear cam passes under the stylus 130 and permits the stylus to move down and engage the ratchet 126 through the frame opening 128 in response to the bias of the spring 133. If an excessive length of belt 106 is withdrawn so that it cannot provide safe restraint for the vehicle operator 114, the ring gear 140 is rotated to such an extent that a second cam user portion 140.3 lifts the stylus 130 away from the ratchet 126 and permits the belt 106 to return to its fully retracted position as will be understood. Preferably the edge of the support sleeve 142 is trimmed where not needed to provide clearance permitting the described lifting and lowering of the stylus 130.

Figure 11:
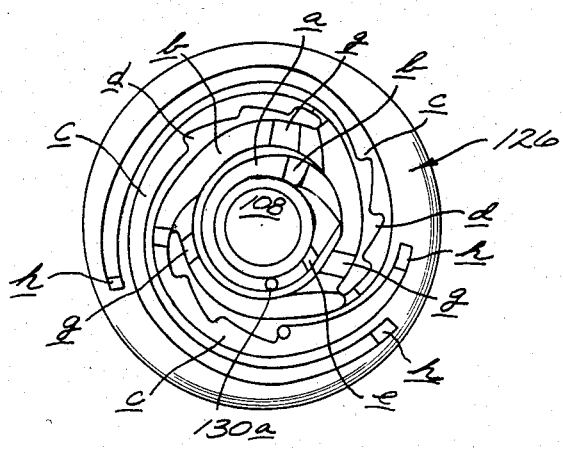
FIGS. 11 and 12 are diagrammatic views illustrating operation of the tensionless belt retraction system of FIG. 8.
Figure 12:
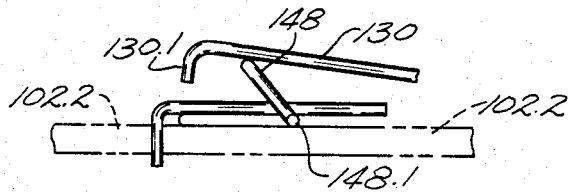
Figure 13:
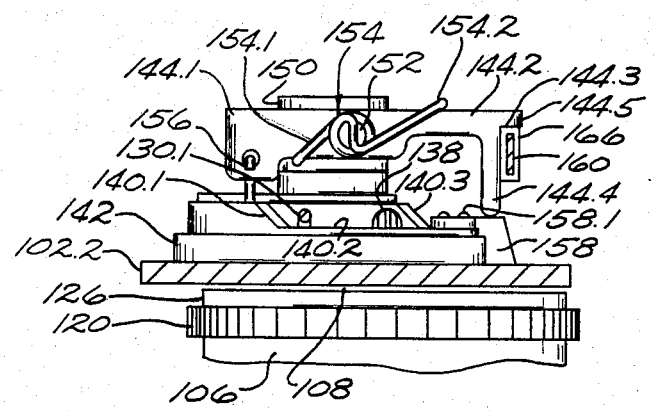
FIG. 13 is a partial section view along line 13—13 of FIG. 8.

The side of the ratchet 126 has concentric inner and outer grooves a and b located around the ratchet axis 108 as is best shown in FIG. 11. A plurality of spiral grooves c extend out from groove b in side-by-side nested relation to each other and spiral in a counterclockwise direction to a location near the ratchet periphery. The stylus 130 is biased by the spring 133 to normally fit down into one of the ratchet grooves and the walls of the grooves tend to guide and retain the stylus in the grooves as the ratchet 126 is rotated. A plurality of ratchet teeth d are formed in spaced relation to each other on the inner side wall of the spiral groove c and each tooth is inclined away from the inner end of the groove c.

When the stylus 130 rests on the cam riser portion 140.1 of the ring gear, the stylus is normally poised over the ratchet groove a by bias of the spring 133 as is diagrammatically illustrated at 130a in FIG. 11. When the ratchet 126 is then rotated clockwise during an initial withdrawal of the belt 106 as the vehicle operator 114 is first buckling on the belt, the stylus 130 moves down from the ring gear cam riser 140.1 and is received in groove a. Groove a has a cam riser e located therein so that, as the belt 106 is further withdrawn, the stylus 130 rides repeatedly around the axis 108 in groove a under bias of the spring 133.

Then, when the operator releases the belt 106 so that the belt is retracted to be drawn snugly against the operator's chest as above described, the ratchet 126 rotates in a counterclockwise direction and stylus 130 engages a second cam riser f in a groove a which lifts the stylus out of groove a into groove b.

Groove b has a plurality of cam riser portions g which are oriented so that they do not interfere with movement of the stylus 130 through groove b during any counterclockwise rotation of the ratchet 126. They therefore permit the belt to be down snugly against the operator's chest as the operator releases the belt to be retracted by its recoiling spring. However, the risers g are oriented so that, when the operator thereafter pulls out an additional length of the belt 106 to provide a tensionless comfort setting of the belt, the ratchet 126 again rotates clockwise and the risers g shunt the stylus 130 into one of the spiral ratchet grooves c.

Each of the spiral ratchet grooves c has a selected length and accordingly if the operator pulls out an excessive length of the belt 106 in attempting to make the desired comfort setting, the stylus 130 will move to the outer end of the selected groove c; will engage a cam riser h at that end of the groove to be lifted out of the groove (c); and will be moved sharply across the ratchet to again enter ratchet groove a by bias of the spring 133, thereby preventing making of the desired comfort setting. However, if the operator withdraws a lesser length of the belt 106 sufficient to provide a safe tensionless comfort setting so that the stylus 130 moves only partly along the length of groove c before the operator releases the belt, the stylus 130 will then lodge behind one of the ratchet teeth d under bias of the spring 133 as indicated in FIG. 11 for preventing further belt retraction, thereby to provide the desired comfort setting.

In that arrangement, it will be understood that if the stylus pawl 130 is lifted out of the selected groove c against the downward bias of the spring 133, the stylus releases its engagement with the ratchet teeth d for permitting the belt 106 to be fully retracted, the stylus 130 being then lifted by the ring gear cam surface 140.1 as the belt retraction is completed to reset the system 100. As belt retractor systems with comfort setting means such as those described above have been previously known, the comfort setting means is not further described herein and it will be understood that other comfort setting means can be provided for cooperation with a stylus pawl like stylus 130 within the scope of this invention.

In accordance with this invention, a latch member 144 is biased to move in a selected direction in a plane from a first latch position to a second latch position to lift the stylus 130 out of engagement with the ratchet 126. An electrically operable latch release mechanism 146 is mounted on the frame 102 for normally holding the latch member 144 in its first latch position but is selectively operable to release the latch and permit it to move to its second position in response to its bias.

Preferably for example, a wire crank member 148 has its opposite ends 148.1 fitted into respective opposite openings in the support sleeve 142 so that the member is rotatable on an axis defined by the ends 148.1 of the member and so that a link portion 148.2 and a stylus lifter portion 148.3 of the wire crank are normally rotated to lay flat over the frame 102 by the downward bias force extended by the stylus 130. A support 150 mounted on the frame 102 extends over the wire crank 148 and a portion of the support 150.1 preferably fits over the ring gear 140 as shown in FIG. 9 to assist in retaining the ring gear in the support sleeve 142. The latch member 144 is pivotably mounted on the support 150 by a stud or screw 152 and a spring 154 is fitted over the screw to engage and normally bias the latch member to move from the position shown in FIG. 13 to the position shown in FIG. 14. Preferably, one spring end 154.1 fits under the latch end 144.1 while the other spring end 154.2 fits over the latch end 144.2 to provide that bias. A link 156 connects the latch end 144.1 to the link portion 148.2 of the wire crank so that, when the latch member moves to the position shown in FIG. 14, the link lifts the wire crank to the oblique position shown in FIGS. 12 and 14 to engage the lifter portion 148.3 of the wire crank with the stylus 130 to lift the stylus out of engagement with the ratchet 126. A latch shoulder 144.3 is provided on the latch end 144.2 and a cam follower 144.4 depends from that end of the latch to a location adjacent the ring gear 140. A double slope cam 158 is secured to the ring gear 140 by rivets 158.1 or the like to move with the ring gear, the cam 158 being located to engage the cam follower 144.4 of the latch member as the ring gear 140 rotates for returning the latch member from the position shown in FIG. 14 to the position shown in FIG. 13 as will be understood. A cam surface 144.5 is also provided on the outer edge of the latch end 144.2.

The electrically operable release mechanism 146 comprises an electrically conductive reverse bimetal 160 and an electrically conductive spring terminal 162 which are mounted on electrically insulating support means 164. The reverse bimetal 160 extends in cantilever relation from the support 164 so that a tip 166 of a mineral-filled nylon material or the like secured over the distal end of the reverse bimetal is normally engaged with the latch member shoulder 144.3 for holding the latch member against bias of spring 154. The spring terminal 162 also extends in cantilever relation from the support 164 so that a contact 162.1 carried on the distal end of the terminal is normally held in resilient electrical engagement with the reverse bimetal when the latch member 144 is in the position shown in FIG. 13 but so that the latch cam 144.5 engages the reverse bimetal tip and moves the reverse bimetal out of electrical engagement with the contact 162.1 when the latch member 144 is in the position shown in FIG. 14 (See FIG. 16). The opposite end of the reverse bimetal is connected to electrical ground through the automobile dome light 168 and the spring terminal 162 is electrically connected to an automotive power source 170 via a door-mounted light switch 172 of the automobile. The support 164 preferably comprises a pair of base members 174 each of which is attached to the frame 102 by rivet means 174.1 or the like, a spacer 176 having respective grooves mounting the spring terminal and reverse bimetal in electrically separated relation to each other between the base member, and rivets 178 or the like which pass through enlarged openings 178.1 (one of which is shown in FIG. 15) for securing the spring terminal and reverse bimetal to the spacer and base members while maintaining them in electrically separated relation.

In accordance with this invention, the reverse bimetal 160 preferably comprises first and second bimetal strips 180 and 182 each having layers of metal of relatively high and low coefficients of thermal expansion (not separately shown) metallurgically bonded together. The two high expansion sides of the bimetal strip are abutted in overlapped relation to each other and are welded together as indicated at 184 in FIG. 9 to form the reverse bimetal 160. The first and second bimetal strips have corresponding thermal response characteristics so that tip 166 at the distal end of the reverse bimetal does not move during changes in ambient temperature. However, the strip materials are selected so that the first strip 180 has relatively much greater electrical resistance than the second strip so that the reverse bimetal is adapted to flex and move the tip 166 when electrical heating current is directed through the reverse bimetal. Preferably for example, the bimetal strips 180 and 182 embody materials as provided in bimetal strips 70 and 78 respectively previously described with reference to FIGS. 1–7 and the reverse bimetal is oriented so that the tip 166 is moved from the position shown in FIG. 8 to the position shown in FIG. 16 in response to electrical self-heating of the reverse bimetal. Preferably also, the bimetal strip 180 has a cut-out portion providing legs 180.1 and 180.2 of the first strip which are of relatively narrow cross-section than the second strip 182 as is shown in FIG. 9.

Figure 14:
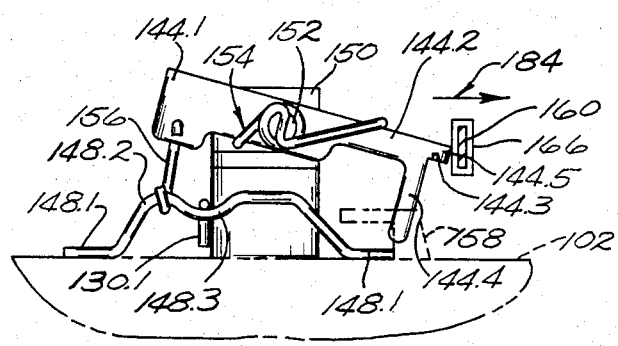
FIG. 14 is a diagrammatic view similar to FIG. 13 showing operation of the system of FIG. 8.
Figure 15:
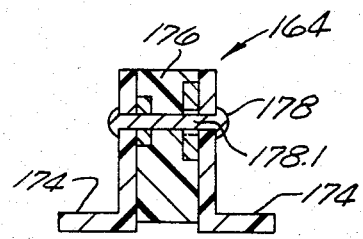
FIG. 15 is a partial section view along line 15—15 of FIG. 8.
Figure 16:
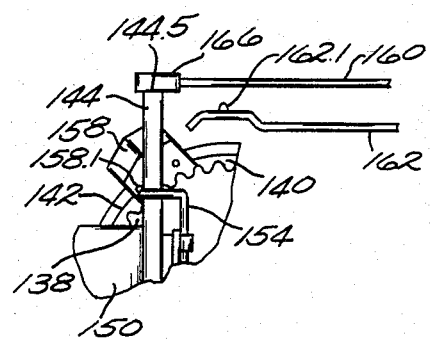
FIG. 16 is a partial side elevation view similar to FIG. 8 illustrating an alternate position of operation of the system of FIG. 8.

In that arrangement of the reverse bimetal 160, it can be seen that the widths of the bimetal strips 180 and 182 extend generally parallel to the direction of movement of the latch member 144 in moving to the position shown in FIG. 14. Further, the relative lengths widths and thicknesses of the strips 180 and 182 are selected so that the reverse bimetal 160 has a preferred direction of flexing wherein the tip 166 moves radially out from the latch member 144 and has a maximum resistance to bending wherein the reverse bimetal resists movement of the latch 144 from the position of FIG. 13 to the position of FIG. 14.

In operation of the system 100, the operator enters the vehicle 104 and closes the vehicle door so that the switch 172 is opened. The operator then draws out and buckles the seat belt 106 over his shoulder. As that occurs, the ring gear 140 rotates and normally releases the stylus 130 from the ring gear cam surface, the cam 158 moves with the ring gear to engage the cam follower 144.4 and lift the latch member 144 to the position shown in FIG. 13 so that the reverse bimetal tip 166 is engaged with the latch shoulder 144.3, and the stylus 130 fits into groove a in the ratchet 126. The operator then releases the belt which is promptly retracted by its retracting spring (not shown) for drawing the belt snugly against the operator's chest. As that occurs, the stylus 130 slides freely in ratchet groove b. The operator then pulls lightly on the belt 106 to withdraw a short additional length of the belt to provide a safe tensionless comfort setting of belt over his shoulder. As that occurs, the stylus 130 is shunted into ratchet groove c. The operator then again releases the belt and the stylus lodges behind a tooth d on the ratchet 126 to provide the desired comfort setting of the belt. If abrupt stopping of the vehicle 104 should occur while the belt has that comfort setting, the inertially operated pawl 122 engages the sawtooth ratchet 120 to provide safe operator restraint.

Then, when the operator subsequently unbuckles the belt 106 and leaves the vehicle 104, opening of the vehicle door permits switch 172 to close to energize the dome light 168 and also to direct electrical current through the spring terminal 162 and reverse bimetal 160 for electrically heating the reverse bimetal. As that occurs, the tip 166 at the distal end of the bimetal releases the latch 144 permitting the latch to rotate under bias of spring 154, thereby to lift wire crank 148 and disengage the stylus 130 from the ratchet tooth d so that the belt 106 is fully retracted by its retracting spring. As the reverse bimetal tip 166 releases the latch member 144, the cam surface 144.5 on the latch pushes the reverse bimetal out of electrical engagement with the terminal contact 162.1. In that way, further heating of the reverse bimetal will not occur even if the vehicle door is left open. As the belt 106 is fully retracted, the ring gear 140 is rotated back to its original position and the double faced cam 158 passes under the cam follower of the latch to lift the latch 144 back toward its latched position. If the reverse bimetal 160 has sufficiently cooled by that time, the latch 144 will engage the reverse bimetal tip 166 for resetting the system 100. Typically however, the reverse bimetal will still be sufficiently heated so that, although the cam 158 momentarily lifts the cam follower 144.4 so resetting of the system will then occur. Later however, when the vehicle operator again begins to withdraw belt 106, movement of the cam 158 under the latch follower 144.4 resets the latch release mechanism.

It should be understood that although particular embodiments of this invention are described by way of illustrating the invention, this invention includes all modifications and equivalents of the disclosed embodiments falling within the scope of the appended claims.

We claim:

1. An electrically operable control mechanism comprising an insulating support, a first thermally responsive bimetal strip, a second thermally responsive bimetal strip welded to the first bimetal strip to form a reverse bimetal, the reverse bimetal having one end secured to the support and having a control portion at its opposite end movable between control positions, and means for directing electrical current through at least a selected portion of the reverse bimetal for self-heating the reverse bimetal, the first and second strips having corresponding thermal response characteristics for maintaining the control portion of the reverse bimetal in a selected control position during changes in ambient temperature, the first strip having relatively greater electrical resistivity than the second strip to be more rapidly self-heated to move the control portion between control positions to perform a control function when electrical current is selectively directed through said selected portion of the reverse bimetal, the first bimetal strip having a U-shape being welded to the second strip and the ends of the two legs of the U-shape being secured to the support in fixed position relative to the support, and the means directing electrical current through the reverse bimetal directing current through the two legs of the U-shape in series for more rapidly self-heating the first strip of the reverse bimetal.

2. A control mechanism according to claim 1 further characterized in that the first bimetal strip comprises a layer of metal of relatively high coefficient of thermal expansion of a metal alloy having a nominal composition by weight of 72 percent manganese, 18 percent copper, and 10 percent nickel bonded to a layer of metal of relatively low coefficient of thermal expansion of a metal alloy having a nominal composition by weight of 36 percent nickel and the balance iron, and the second bimetal strip comprises layers of each of said metal alloys bonded to respective opposite sides of a metal layer of a relatively high electrical conductivity copper alloy.

3. An electrically operable control mechanism having a latch biased to move in a selected direction in a plane from a first latch position to a second latch position, an insulating support, a first thermally responsive bimetal strip, a second thermally responsive bimetal strip welded at one end to an end of the first bimetal strip to form a reverse bimetal, the reverse bimetal having one end secured to the support and having a control portion at its opposite end movable between control positions, and means for directing electrical current through at least a selected portion of the reversed bimetal for self-heating the reverse bimetal, the materials of the first and second strips having corresponding thermal response characteristics for maintaining the control portion of the reverse bimetal in a selected control position during changes in ambient temperature, the materials of the first strip having relatively greater electrical resistivity than the materials of the second strip to be more rapidly self-heated to move the control portion between control positions when electrical current is selectively directed through said selected portion of the reverse bimetal, the first and second bimetal strips each having layers of metal of relatively high and low coefficients of thermal expansion bonded together in layer relation to each other and having selected lengths, widths and thicknesses providing the reverse bimetal with a preferred direction of flexing perpendicular to the metal layers in response to temperature change and with a maximum resistance to bending in response to applied force in a direction transverse to the widths of the first and second strips, the reverse bimetal being secured to the support so that the widths of the strips extend parallel to the direction of latch movement so that the control portion of the reverse bimetal intercepts and opposes movement of the latch from the first latch position before heating of the reverse bimetal and reliably releases the latch to move in response to its bias to a second latch position when the reverse bimetal is self-heated by said electrical current.

4. An eleectrically operable control mechanism having a latch biased to move in a selected direction in a plane from a first latch position to a second latch position, an insulating support, a first thermally responsive bimetal strip, a second thermally responsive bimetal strip welded at one end to an end of the first bimetal strip to form a reverse bimetal, the reverse bimetal having one end secured to the support and having a control portion at its opposite end movable between control positions, and means for directing electrical current through at least a selected portion of the reverse bimetal for self-heating the reverse bimetal, the first and second strips having corresponding thermal response characteristics for maintaining the control portion of the reverse bimetal in a selected control position during changes in ambient temperature, the first strip having relatively greater electrical resistivity than the second strip to be more rapidly self-heated to move the control portion between control positions when electrical current is selectively directed through said selected portion of the reverse bimetal, the first and second bimetal strips each having layers of metal of relatively high and low coefficients of thermal expansion bonded together in layer relation to each other and having selected lengths, widths and thicknesses providing the reverse bimetal with a preferred direction of flexing perpendicular to the metal layers in response to temperature change and with a maximum resistance to bending in response to applied force in a direction transverse to the widths of the first and second strips, the reverse bimetal being secured to the support so that the widths of the strips extend parallel to the direction of latch movement so that the control portion of the reverse bimetal intercepts and opposes movement of the latch from the first latch position before heating of the reverse bimetal and reliably releases the latch to move in response to its bias to a second position when the reverse bimetal is self-heated by said electrical current, the mechanism having contact means arranged in series with the reverse bimetal to be selectively separated for interrupting the flow of current in the reverse bimetal to avoid overheating thereof.

5. A control mechanism according to claim 4 further characterized in that a resilient contact arm is mounted on the support to be moved into and out of engagement with the reverse bimetal, and the current directing means are connected to the resilient contact arm and the reverse bimetal for directing electrical current through the reverse bimetal when the reverse bimetal and contact arm are engaged, the contact arm being adapted to be separated from the reverse bimetal by movement of the latch when the latch moves out of the first latch position for avoiding overheating of the reverse bimetal.

6. A control mechanism according to claim 5 further characterized in that tip means having relatively low friction characteristics are provided on the control portion of the reverse bimetal.

7. An electrically operable control mechanism having a latch biased to move in a selected direction in a plane from a first latch position to a second latch position, an insulating support, a first thermally responsive bimetal strip having a U-shape having a bottom and two legs, a second thermally responsive bimetal strip welded at one end to the bottom of the U-shape of the first bimetal strip to form a reverse bimetal, the reverse bimetal having one end secured to the support and having a control portion at its opposite end movable between control positions, and means for directing electrical current through at least a selected portion of the reversed bimetal for self-heating the reverse bimetal, the first and second strips having corresponding thermal response characteristics for maintaining the control portion of the reverse bimetal in a selected control position during changes in ambient temperature, the first strip having relatively greater electrical resistivity than the second strip to be more rapidly self-heated to move the control portion between control positions when electrical current is selectively directed through said selected portion of the reverse bimetal, the first and second bimetal strips each having layers of metal of relatively high and low coefficients of thermal expansion bonded together in layer relation to each other and having selected lengths, widths and thicknesses providing the reverse bimetal with a preferred direction of flexing perpendicular to the metal layers in response to temperature change and with a maximum resistance to bending in response to applied force in a direction transverse to the widths of the first and second strips, the reverse bimetal being secured to the support so that metal layers extend generally parallel to the plane of movement of the latch and the widths of the strips extend parallel to the direction of latch movement so that the control portion of the reverse bimetal intercepts and opposes movement of the latch from the first latch position before heating of the reverse bimetal and reliably releases the latch to move in response to its bias to a second latch position when the reverse bimetal is self-heated by said electrical current.

8. A safety belt mechanism comprising belt supply means permitting a length of belt to be withdrawn, means normally retracting withdrawn belt, latch means having a latch member movable in a selected direction from a first position in a plane limiting belt retraction to a second position in the plane permitting belt retraction, thermostat metal means normally opposing movement of the latch means member from the first position and movable when heated to release the latch means member to move to the second position, and means for selectively heating the thermostat metal means to release the latch means, characterized in that, the thermostat metal means comprises a first thermally responsive bimetal strip having layers of metal of relatively high and low coefficients of thermal expansion bonded together in layer relation to each other and having a selected length, width and thickness providing the strip with a preferred direction of flexing perpendicular to the layers in response to temperature change and with a maximum resistance to bending in response to applied force in a direction transverse to the width of the strip, the thermostat metal means being disposed in the mechanism with the width of the strip extending parallel to the direction of movement of the latch means member to reliably oppose latch means member movement before heating of the thermostat metal means and to reliably release the latch means member when the thermostat metal means are selectively heated.

9. A mechanism according to claim 8 having electrical means for selectively heating the thermostat metal means, further characterized in that, second thermally responsive bimetal strip means are arranged to be responsive to changes in ambient temperature to counteract movement of the first thermally responsive bimetal strip in response to ambient temperature changes for avoiding release of the latch means members due to changes in ambient temperature.

10. A safety belt mechanism comprising belt supply means permitting a length of belt to be withdrawn, means normally retracting withdrawn belt, latch means having a latch member movable in a selected direction from a first position in a plane limiting belt retraction to second position in the plane permitting belt retraction, thermostat metal means normally opposing movement of the latch means member from the first position and movable when heated to release the latch means member to move to the second position, and electrical means for selectively heating the thermostat metal means to release the latch means, characterized in that the thermostat metal means comprises a first thermally responsive bimetal having layers of metal of relatively high and low coefficients of thermal expansion bonded together in layer relation to each other and having a selected length, width and thickness providing the strip with a preferred direction of flexing perpendicular to the layers in response to temperature change and with a maximum resistance to bending in response to applied force in a direction transverse to the width of the strip, the thermostat metal means being disposed in the mechanism with the width of the strip extending parallel to the direction of movement of the latch means member to reliably oppose latch means member movement before heating of the thermostat metal means and to reliably release the latch means member when the thermostat metal means are selectively heated, and in that a second thermally responsive bimetal strip having thermal response characteristics corresponding to those of the first bimetal strip is welded to the first bimetal strip to form a reverse bimetal to counteract movement of the first strip in response to changes in ambient temperature for avoiding release of the latch means member due to ambient temperature changes, the means for electrically heating the thermostat metal means selectively direct electrical current through the reverse bimetal for self-heating thereof, and the material of the first bimetal strip had relatively greater electrical resistivity than the material of the second strip of the latch means member.

11. A mechanism according to claim 10 further characterized in that the first bimetal strip has a portion of relatively smaller cross section than the second strip and the means selectively heating the thermostat metal means direct electrical current through the said relatively small cross-section portion for more rapidly heating the thermostat metal means to effect selective release of the latch means member.

12. A mechanism according to claim 10 further characterized in that the first bimetal strip has a U-shape having a bottom and two legs and the means selectively heating the thermostat metal means direct electrical current through the two legs of the U-shape in series for more rapidly heating the thermostat metal means to effect selective release of the latch means member.

13. A mechanism according to claim 11 or 12 further characterized in that the first bimetal strip comprises a layer of metal of relatively high coefficient of thermal expansion of a metal alloy having a nominal composition by weight of 72 percent manganese, 18 percent copper, and 10 percent nickel bonded to a layer of metal of relatively low coefficient of thermal expansion of a metal alloy having a nominal composition by weight of 36 percent nickel and the balance iron, and the second bimetal strip comprises a layer of each of said metal alloys bonded to respective sides of a metal layer of a relatively high electrical conductivity copper alloy.

14. A safety belt mechanism comprising a frame, a belt supply reel rotatably mounted on the frame, a belt coiled on the reel to permit a length of belt to be withdrawn from the reel, a spring normally biasing the reel to rotate to retract and recoil a length of belt withdrawn from the reel, latch means movable between a first position limiting belt retraction to permit a selected length of belt to be retained withdrawn against the spring bias and a second position permitting belt retraction, the latch means having a latch arm pivotable in a selected direction in a plane as the latch means is moved between the first and second positions thereof, a release mechanism having thermostat metal means normally engaging the latch arm to oppose movement of the latch means from the first latch position, the thermostat metal means being movable when heated to release the latch arm to permit the latch means to move to the second latch position, and means for electrically heating the thermostat metal means to selectively release the latch arm, characterized in that, the release mechanism comprises an electrically insulating support, and the thermostat metal means comprises a first thermally responsive bimetal strip having layers of metal of relatively high and low coefficients of thermal expansion bonded together in layer relation to each other and having a selected length, width and thickness providing the strip with a preferred direction of flexing in response to temperature change and with a maximum resistance to bending in response to applied force in a direction transverse to the width of the strip, the strip is mounted on the support to permit flexing of the strip in response to temperature change, and the support is mounted on the frame with the width of the strip extending parallel to the direction of movement of the latch arm to dispose the thermostat metal means for engaging the latch arm to reliably oppose latch means movement before heating of the thermostat metal means and to reliably release the latch means when the thermostat metal means are selectively heated.

15. A safety seat belt mechanism comprising a frame, a belt supply reel rotatably mounted on the frame, a belt coiled on the reel to permit a length of belt to be withdrawn from the reel, a spring normally biasing the reel to rotate to retract and recoil a length of belt withdrawn from the reel, latch means movable between a first position limiting belt retraction to permit a selected length of belt to be retained withdrawn against the spring bias and a second position permitting belt retraction, the latch means having a latch arm pivotable in a selected direction in a plane as the latch means is moved between the first and second positions thereof, a release mechanism having thermostat metal means normally engaging the latch arm to oppose movement of the latch means from the first latch position, the thermostat metal means being movable when heated to release the latch arm to permit the latch means to move to the second latch position, and means for electrically heating the thermostat metal means to selectively release the latch arm, characterized in that the release mechanism comprises an electrically insulating support, and the thermostat metal means comprises a first thermally responsive bimetal strip having layers of metal of relatively high and low coefficients of thermal expansion bonded together in layer relation to each other and having a selected length, width and thickness providing the strip with a preferred direction of flexing in response to temperature change and with a maximum resistance to bending in response to applied force in a direction transverse to the width of the strip, the strip is mounted on the support to permit flexing of the strip in response to temperature change, and the support is mounted on the frame with the width of thestrip extending parallel to the direction of movement of the latch arm to dispose the thermostat metal means for engaging the latch arm to reliably oppose latch means movement before heating of the thermostat metal means and to reliably release the latch means when the thermostat metal means are selectively heated, and in that a second thermally responsive bimetal strip is welded to the first strip to form a reverse bimetal, one end of the reverse bimetal is secured to the support and the opposite end of the reverse bimetal has a control portion arranged to move from a first control position engaging the latch arm to oppose movement of the latch means from the first latch position and a second control position releasing arm engagement to permit the latch means to move to the second latch position, the first and second bimetal strips are provided with corresponding thermal response characteristics for maintaining the control portion of the reverse bimetal in a selected control position during changes in ambient temperature, the means for electrically heating the thermostat metal means direct electrical current through the reverse bimetal for self-heating the reverse bimetal, and the material of the first bimetal strip has relatively greater electrical resistivity than the material of the second bimetal strip to be more rapidly heated to effect selective release of the latch means.

16. A safety belt mechanism according to claim 15 further characterized in that the first bimetal strip has a U-shape having a bottom and two legs and the means electrically heating the thermostat metal means direct electrical current through the two legs of the U-shape in series for more rapidly heating the thermostat metal means to effect selective release of the latch means.

17. A safety belt mechanism according to claim 15 further characterized in that the first bimetal strip has a cut-out therein providing the strip with narrow leg portions of reduced cross section through which said electrical current is directed for more rapidly heating the thermostat metal means to effect selective release of the latch means.

18. A safety belt mechanism according to claim 15 further characterized in that the first bimetal strip has a U-shape extending from an end of the strip to an opposite end of the strip so that the bottom of the U-shape is disposed at one end of the U-shape and the two legs of the U-shape terminate at the opposite end of the strip, said one end of the first strip is welded to one end of the second bimetal strip to form said reverse bimetal, and the control portion of the reverse bimetal is disposed at the opposite end of the second strip, and the first and second terminals are connected to the respective legs of the U-shape of the first strip for directing said electrical current through the two legs in series to more rapidly heat the first strip of reverse bimetal.

19. A safety belt mechanism according to claim 18 further characterized in that contact means are arranged in series with the reverse bimetal to be separated for interrupting the flow of electrical current in the reverse bimetal, and cam means are provided on the latch arm for movement with the latch arm as the latch means are moved into the second latch position to terminate self-heating of the reverse bimetal after release of the latch means has occurred.

20. A safety belt mechanism according to claim 19 further characterized in that additional cam means are provided on the latch arm for alternate operation with the first cam means in separating the contact means whenever the latch means is out of the first latch position.

21. A safety belt mechanism according to claim 20 further characterized in that tip means having relatively low friction characteristics are secured to the control portion of the thermostat metal means for facilitating selective release of the latch means.

22. A safety belt mechanism comprising a frame, a belt supply means rotatably mounted on the frame, a belt coiled on the supply means to permit a length of belt to be withdrawn from the supply means, spring means normally biasing the supply means to rotate to retract and recoil a length of belt withdrawn from the supply means, clutch means selectively settable to permit a selected length of belt to be retained withdrawn against the spring bias to provide a safe tensionless comfort setting for the belt, latch means movable between a first position retaining the clutch means set to limit belt retraction and permit said selected length of belt to be retained withdrawn against the spring bias and a second position releasing the clutch means and permitting belt retraction, the latch means having a latch arm pivotable in a selected direction in a plane as the latch means is moved between the first and second positions thereof, a release mechanism having thermostat metal means normally engaging the latch arm to oppose movement of the latch means from the first latch position, the thermostat metal means being movable when heated to release the latch arm to permit the latch means to move to the second latch position, and means for electrically heating the thermostat metal means to selectively release the latch arm, characterized in that, the release mechanism comprises an electrically insulating support, and the thermostat metal means comprises a first thermally responsive bimetal strip having layers of metal of relatively high and low coefficients of thermal expansion bonded together in layer relation to each other and having a selected length, width and thickness providing the strip with a preferred direction of flexing in response to temperature change and with a maximum resistance to bending in response to applied force in a direction transverse to the width of the strip, the strip is mounted on the support to permit flexing of the strip in response to temperature change, and the support is mounted on the frame with the metal layers of the strip extending generally parallel to the plane of movement of the latch arm and with the width of the strip extending parallel to the direction of movement of the latch arm to dispose the thermostat metal means for engaging the latch arm to reliably oppose latch means movement before heating of the thermostat metal means and to reliably release the latch means when the thermostat metal means are selectively heated.

23. A safety belt mechanism comprising a frame, a belt supply means rotatably mounted on the frame, a belt coiled on the supply means to permit a length of belt to be withdrawn from the supply means, spring means normally biasing the supply means to rotate to retract and recoil a length of belt withdrawn from the supply means, ratchet means movable with the supply means, stylus means selectively engageable with the ratchet means to permit a selected length of belt to be retained withdrawn against the spring bias to provide a safe tensionless comfort setting for the belt, latch means movable between a first position permitting the stylus means to limit belt retraction to permit said selected length of belt to be retained withdrawn against the spring bias and a second position permitting belt retraction, the latch means having a latch arm pivotable in a selected direction in a plane as the latch means is moved between the first and second positions thereof, a release mechanism having thermostat metal means normally engaging the latch arm to oppose movement of the latch means from the first latch position, the thermostat metal means being movable when heated to release the latch arm to permit the latch means to move to the second latch position, and means for electrically heating the thermostat metal means to selectively release the latch arm, characterized in that, the release mechanism comprises an electrically insulating support, and the thermostat metal means comprises a first thermally responsive bimetal strip having layers of metal of relatively high and low coefficients of thermal expansion bonded together in layer relation to each other and having a selected length, width and thickness providing the strip with a preferred direction of flexing in response to temperature change and with a maximum resistance to bending in response to applied force in a direction transverse to the width of the strip, the strip is mounted on the support to permit flexing of the strip in response to temperature change, and the support is mounted on the frame with the width of the strip extending parallel to the direction of movement of the latch arm to dispose the thermostat metal means for engaging the latch arm to reliably oppose latch means movement before heating of the thermostat metal means and to reliably release the latch means when the thermostat metal means are selectively heated.

24. An electrically operable control mechanism comprising an insulating support, a first thermally responsive bimetal strip, second thermally responsive bimetal strip welded to the first bimetal strip to form a reverse bimetal, the reverse bimetal having one end secured to the support and having a control portion at its opposite end movable between control positions, and means for directing electrical current through at least a selected portion of the reverse bimetal for self-heating the reverse bimetal, the first and second strips having corresponding thermal response characteristics for maintaining the control portion of the reverse bimetal in a selected control position during changes in ambient temperature, the first strip having relatively greater electrical resistivity than the second strip to be more rapidly self-heated to move the control portion between control positions to perform a control function when electrical current is selectively directed through said selected portion of the reverse bimetal, the first bimetal strip having a portion of relatively smaller cross-section than the second strip through which the electrical current is directed for enhancing self-heating of the first strip by the current, the first bimetal strip comprising a layer of metal of relatively high coefficient of thermal expansion of a metal alloy having a nominal composition by weight of 72 percent manganese, 18 percent copper, and 10 percent nickel bonded to a layer of metal of relatively low coefficient of thermal expansion of a metal alloy having a nominal composition by weight of 36 percent nickel and the balance iron, and the second bimetal strip comprising layers of each of said metal alloys bonded to respective opposite sides of a metal layer of a relatively high electrical conductivity copper alloy.

* * * * *